United States Patent [19]

Johnson

[11] Patent Number: 4,498,939
[45] Date of Patent: Feb. 12, 1985

[54] METHOD AND APPARATUS FOR MAKING ZIPPER BAGS

[76] Inventor: James R. Johnson, 3819 Greenhill Dr., Chamblee, Ga. 30341

[21] Appl. No.: 455,338

[22] Filed: Jan. 3, 1983

[51] Int. Cl.³ .............................................. B65D 27/20
[52] U.S. Cl. .................................. 156/66; 156/308.4; 156/499; 156/553; 156/583.5; 383/97
[58] Field of Search .................. 156/66, 244.11, 308.4, 156/499, 553, 583.5; 229/77, 79; 383/63, 97

[56] References Cited

U.S. PATENT DOCUMENTS 4,212,337  7/1980  Kamp ................................. 383/63
4,308,087  12/1981  Johnson ...................... 156/308.4 X Primary Examiner—Robert Dawson
Attorney, Agent, or Firm—James B. Middleton

[57] ABSTRACT

A method and apparatus for attaching heavy weight plastic zippers to light weight plastic bag material. The method includes the steps of aligning the zippers with the bag material and holding the zippers and bag material between a pair of belts. The motion of the bag material drives the pair of belts at the same speed. Heated rails are pressed lightly against one of the belts so that heat passes through the belt and heats the bag material and zipper material only enough to seal the back of the bag material to the back zipper piece. The bag material is then held over a roll, and heated air is directed along a line to heat only the front piece of the bag material and the front zipper piece enough to seal. The bag material is then slit in the middle, and side sealed and cut by conventional means.

9 Claims, 5 Drawing Figures

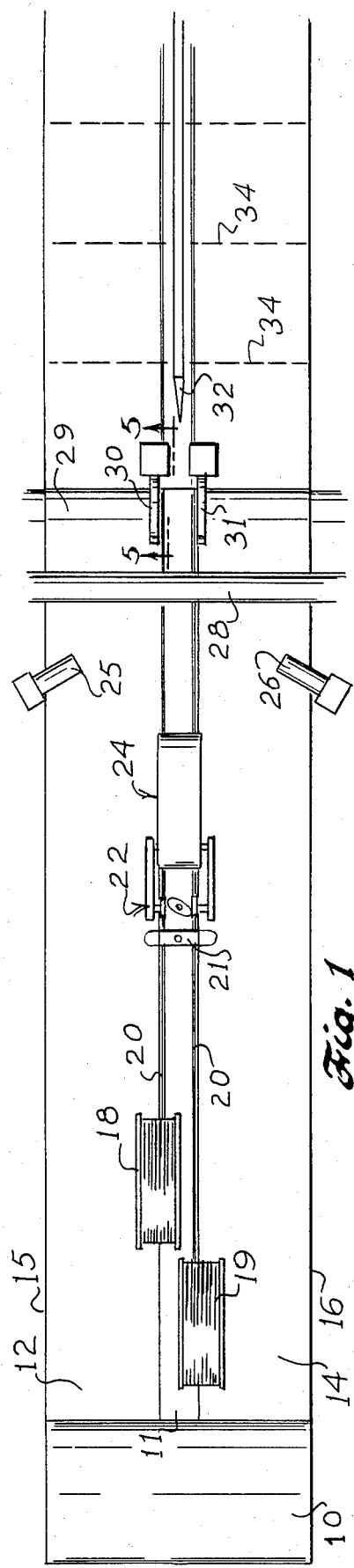
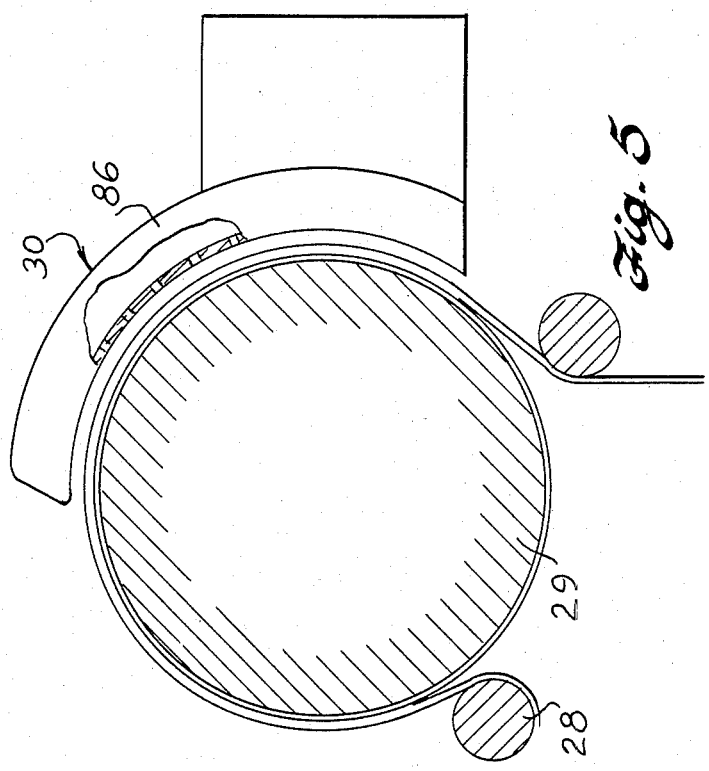
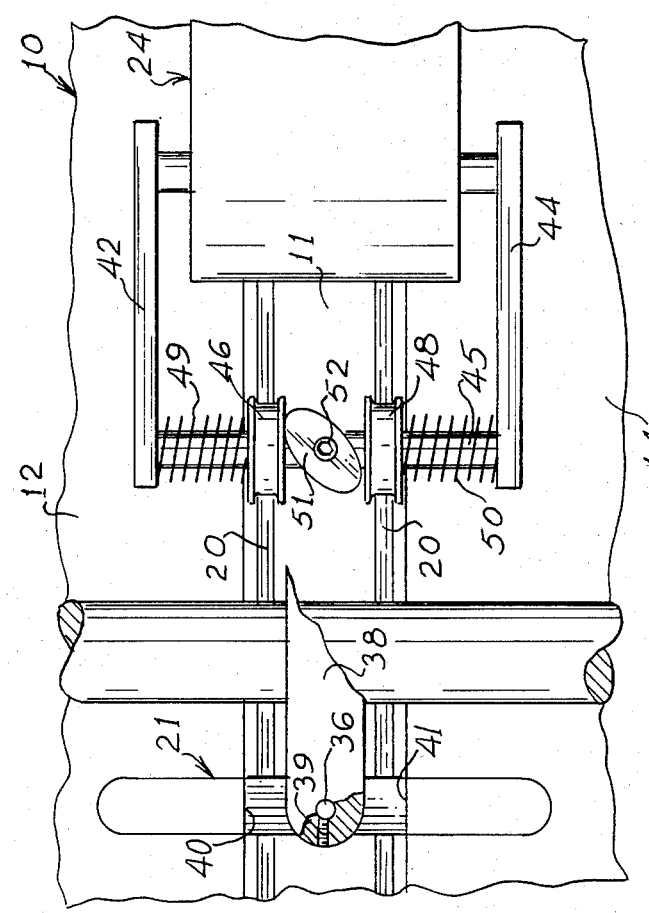

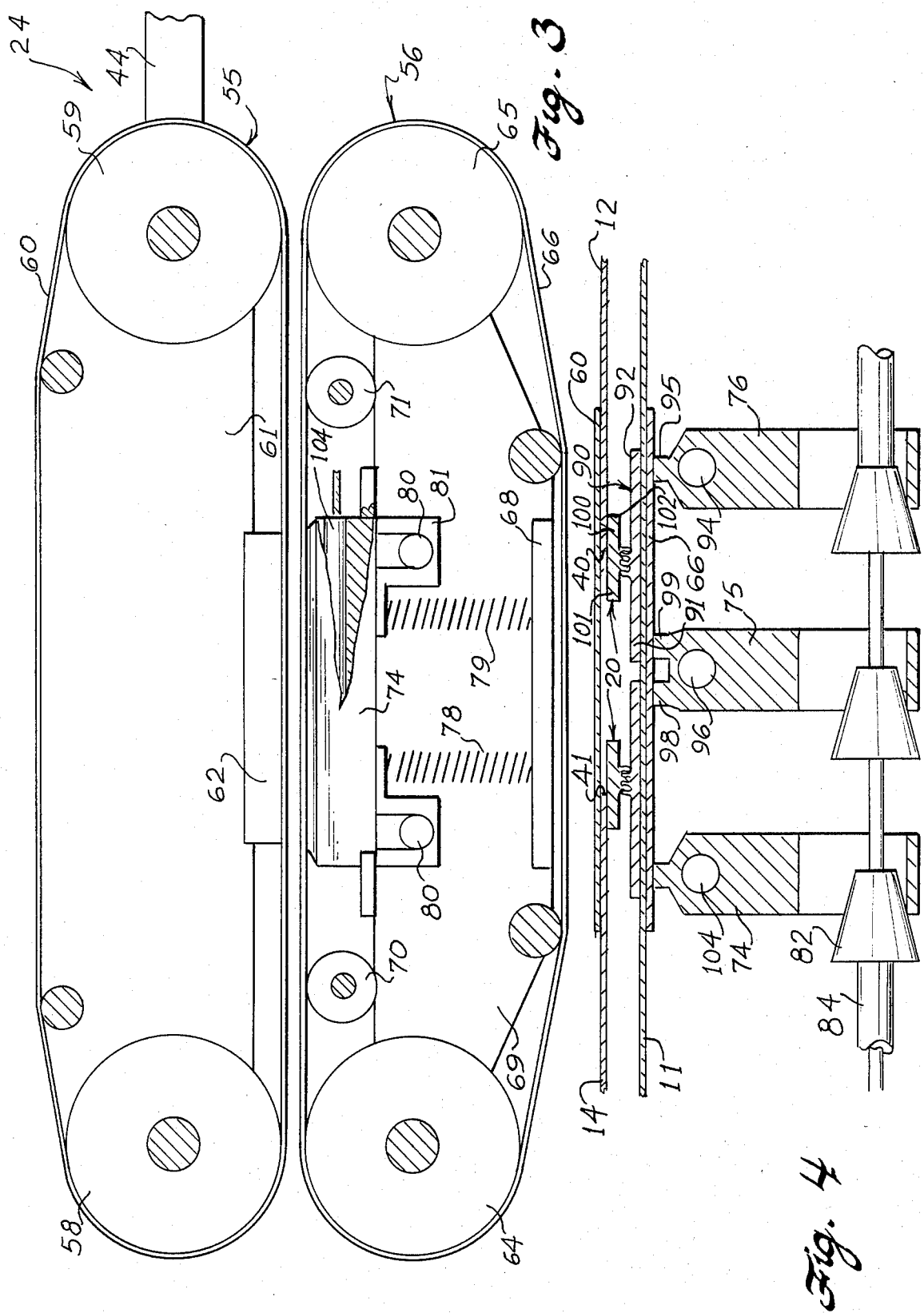

METHOD AND APPARATUS FOR MAKING ZIPPER BAGS

FIELD OF THE INVENTION

This invention relates generally to the sealing of plastic sheet material, and is more particularly concerned with a method and apparatus for heat sealing relatively heavy gauge material to relatively light gauge material, the invention having particular application in the sealing of zippers to plastic bags.

BACKGROUND OF THE INVENTION

There is a very large market fo plastic bags having zipper closures, and the market extends from the every inexpensive light gauge bags up to the high quality heavy gauge bags. There are two forms of bags having zippers. One form of bag with zipper is made by extruding the zipper and the bag simultaneously so there is no problem in providing the bags in any desired thickness. Another form of bag with zipper is made by applying a strip of zipper material to plastic sheet material during the formation of plastic bags. In this latter form of zipper bag, there have been limits in the weight of bag material that can be used because of the relatively heavy gauge in which the zipper material is provided. The zipper material is customarily around 8 mils or so, while there is a large market for plastic bags having a thickness of around 1 mil. Due to the vast difference in thickness, if the materials are heated sufficiently to melt the heavy material enough to effect a weld, the thin material is melted to the point that it loses its integrity and no weld can be made. Conversely, if the materials are heated only sufficiently to melt the thin material enough to allow a weld, the thick material is not hot enough and no weld can be made.

SUMMARY OF THE INVENTION

The present invention overcomes the above mentioned and other difficulties with the prior art method and apparatus by providing means for sealing relatively thick thermoplastic materials to relatively thin thermoplastic materials. While the present invention is particularly adapted for the application of heavy zipper material to light bag material, it will be understood that the invention is equally adaptable to other operations.

The invention includes the steps of aligning the pieces to be sealed together, and holding the pieces so aligned between belt means having the same linear speed as the pieces to be sealed. Sealing rails lightly engage a belt means, the length and temperature of the sealing rails being controlled so that only the desired heating of the pieces to be sealed is effected while the pieces to be sealed traverse the sealing rails. In the case of the sealing of zipper material to bag material, the back of the bag and zipper are sealed by the sealing rails, and the front of the bag is subsequently engaged by heated air. Again, the temperature and duration of the air are selected so that only the desired heating is effected. Following sealing of the front of the bag material, the material is side sealed and cut as is conventional.

The present invention therefore provides a method and apparatus for obtaining a true weld between thermoplastic sheets having different thickness, while maintaining the integrity of both sheets.

BRIEF DESCRIPTION OF THE DRAWINGS

These and other features and advantages of the present invention will become apparent from consideration of the following specification when taken in conjunction with the accompanying drawings in which:

FIG. 1 is a somewhat schematic top plan view of apparatus made in accordance with the present invention for applying zipper material to bag material;

FIG. 2 is an enlarged top plan view showing a zipper strip aligning apparatus;

FIG. 3 is an enlarged cross-sectional view taken substantially along the line 3—3 in FIG. 1;

FIG. 4 is a cross-sectional view taken substantially along the line 4—4 in FIG. 3, the background details being omitted for clarity; and, FIG. 5 is an enlarged cross-sectional view taken substantially along the line 5—5 in FIG. 1.

DESCRIPTION OF AN EMBODIMENT OF THE INVENTION

Referring now more particularly to the drawings, and to that embodiment of the invention here presented by way of illustration, FIG. 1 shows a roll of plastic bag material 10 which is conventional. Those skilled in the art will recognize that the bag material 10 comprises a sheet having the longitudinal edges folded over, so there is a back, or bottom, sheet 11 with top, or front, pieces 12 and 14. The edges 15 and 16 of the material 10 will eventually be the bottom of the complete bag. The technique is to slit the back sheet 11 and seal cut transversely to form discrete bags.

Thus, when zipper material is to be applied to the bag material, the strips of zipper material must be sealed both to the back piece 11 and to the front pieces 12 and 14.

As here shown, there are two rolls of zipper material 18 and 19. The roll 18 supplies zipper material for the left side of the apparatus, having the back 11 and front piece 12; and, the roll 19 supplies zipper material for the right side of the apparatus, having the back 11 and front piece 14. The zipper material includes two strips of material, one strip being fixed to the back and one strip being fixed to the front, the two strips being then interengageable to act as a zipper.

It will be understood that the zipper material, which will be generally designated at 20, must be placed between the front and the back of the bag, therefore it must be placed between the back 11 and the front 12 and 14. The zipper material 20 is therefore guided beneath the lifter 21 which lifts the front pieces 12 and 14. The zipper material 20 is then aligned by aligning rollers 22 which accurately place the zipper material 20 with respect to the bag material 10. Following this alignment, the assembly passes through the back sealer 24. The material 10 is held taut by the angled rollers 25 and 26.

To seal the front of the bags, the bag material 10 passes under a roll 28, then around a large sealing roll 29 where the front pieces 12 and 14 are engaged by heated air from the air distributors 30 and 31. The heated air seals the front pieces 12 and 14 to the zipper material 20, so the zipper material is then completely sealed to the bag material.

The material is next directed along the path where the back 11 is slit between the zippers 20 by conventional slitting means 32, and side sealed and cut, as along the broken lines 34. Due to the thickness of the zipper material, it may be necessary to pre-heat the zipper material before attempting to make a side seal with conventional apparatus. Those skilled in the art are aware that such pre-heating can be accomplished with a sonic horn or with mechanical apparatus as desired.

Attention is directed to FIG. 2 of the drawings which shows the lifter 21 and aligning rolls 22 in more detail. It will be seen that the lifter 21 includes an elongate member 35 extending to each side from a central support rod 36. The member 35 is supported by the rod 36 to be above the back 11; and, the front pieces 12 and 14 are trained over the member 35.

The support rod 36 is held by an extending bar 38, the position of the rod 36 being variable by means of the set screw 39. It will therefore be understood that the height of the member 35 above the back 11 is adjustable. It will of course be understood from the foregoing that the inner edges 40 and 41 of the front pieces 12 and 14 are lifted to allow the zipper material 20 to be placed between the front and back of the bag.

Once the zipper material 20 is generally in place, it must be accurately aligned. The alignment is accomplished by the aligning rolls 22. This structure is supported from a pair of arms 42 and 44 carried from the back sealer 24. The arms 42 and 44 have a shaft 45 extending therebetween and carrying a pair of double flanged wheels 46 and 48. The wheels 46 and 48 have appropriate bearings so that the wheels 46 and 48 are freely rotatable about the shaft 45, and are freely slidable axially thereof.

To position the wheels 46 and 48 axially of the shaft 45, a pair of springs 49 and 50 surrounds the shaft 45, the spring 49 acting between the arm 42 and the wheel 46 to urge the wheel 46 towards the center of the apparatus. The spring 50 acts between the arm 44 and the wheel 48 to urge the wheel 48 towards the center of the apparatus. The action of these springs is resisted by a cam 51. The cam 51 is carried by the shaft 45, and is selectively rotatable about the screw 52. Thus, the screw 52 can be loosened, the cam 51 rotated, and the screw 52 tightened to hold the cam 51 in the preset position.

It will therefore be seen that the springs 49 and 50 hold the wheels 46 and 48 against the cam 51. The cam 51 can therefore be rotated to determine the spacing between the wheels 46 and 48. Since the zipper material 20 has a well-defined thick area, the flanges on the wheels 46 and 48 urge the thick area towards the center of the wheels. The zipper material 20 is therefore accurately located.

The back sealer 24 is shown in more detail in FIGS. 3 and 4. Looking first at FIG. 3, the back sealer 24 includes an upper hold down unit 55 and a lower heater bar unit 56. The upper unit 55 includes a pair of rollers 58 and 59 having a belt 60 trained thereover. The rollers 58 and 59 are supported from side plates 61, and a platen 62 is carried between the side plates 61. It should be noted that the rollers 58 and 59 are freely rotatable, and are not driven except by the bag material 10.

The lower unit 56 also includes a pair of rollers 64 and 65 having a belt 66 therearound. A plurality of heater bars is carried from a support plate 68 that extends between side plates 69. Between the rollers 64 and 65 and the heater bars, there are additional double flanged aligning rollers 70 and 71 to be sure the zipper material is properly held as it goes through the back sealer 24.

Looking now at FIGS. 3 and 4, it will be seen that the embodiment of the invention here shown includes three heater bars 74, 75 and 76. Each of these heater bars is urged upwardly by a pair of springs such as the springs 78 and 79, one spring being at each end so the two ends are separately adjustable. The heater bars are then held down by height adjusting means generally designated at 80.

The height adjusting means may take any desired form, the only object being to resist the force of the springs 78 and 79 and allow accurate adjustment of the height of the heater bars 74, 75 and 76. The height adjusting means here shown includes a slotted tab 81 depending from the heater bar 74. A frustoconical cam 82 is carried by a shaft 84, and is movable axially of the shaft 84. As a result, it will be understood that, as the cam 82 moves to the left as shown in FIG. 4, the spring 79 can move the heater bar 74 up to ride against the smaller portion of the cam 82. As the cam 82 moves to the right, the larger end of the cam 82 will engage the tab 81 and move the heater bar 74 down. Thus, accurate lateral placement of the cam 82 causes accurate vertical placement of the tab 81, hence the heater bar 74.

All of the heater bars have height adjustment means like the one described, and the arrangement should be well understood by those skilled in the art without repetition.

Looking next at FIG. 5 of the drawings, reference is made to U.S. Pat. No. 4,308,087, issued on Dec. 29, 1981, which discloses the method and apparatus for sealing plastic films by holding the films over a roll and directing heated air against the film. The front sealers 30 and 31 are constructed in the same way, and the disclosure in said U.S. Pat. No. 4,308,087 is incorporated herein by reference.

Considering the disclosure in the cited patent, it will be understood by those skilled in the art that the bag material 10 having the zipper material 20 thereon is trained over the roll 29 with the lines to be sealed held on land portions such as the land 85. The air distributing means 86 is then placed concentric to the roll 29, and heated air is directed against the land 85. The power delivered to the heaters can be varied until the desired seal is achieved.

Attention is again directed to FIG. 4 of the drawings for a more detailed discussion of the sealing of the back 11 to the zipper material 20. In FIG. 4, the zipper material 20 is shown enlarged, so it can be seen that the zipper 20 includes a back piece 90 having an upper flange 91 to be fixed to the upper part of the bag, to the center portion of the back piece 11. There is a lower flange 92 extending towards the bottom of the bag, or towards the edge 15 or 16.

The heater bar 76 has a heating element 94 therein to heat the entire bar; and, the upper surface of the heater bar 76 defines a sealing rail 95. It will be seen that the rail 95 is below the lower flange 92 of the zipper 20 for sealing the lower edge to the back 11.

The heater bar 75 also has a heating element 96 therein for heating the entire heater bar. The heater bar 75 defines two sealing rails 98 and 99 on its upper surface. As is shown in FIG. 4, the center heater bar 75 is beneath the upper flanges of both the zippers 20, so the single heater bar 75 defines the two rails 98 and 99 for sealing both top flanges 91 to the back 11.

FIG. 4 also illustrates the line to be sealed when sealing the fronts 12 and 14 to the other zipper piece. It will be seen that the zipper 20 further includes a front piece 100 which has an upper, free flange 101 and a lower flange 102. The lower flange 102 is overlapped by the front piece 12 of the bag material 10, and this overlapped area is to be sealed by the hot air sealers 30 and 31.

The heater bar 74 has a heating element 104. This arrangement is like the heater bar 76, so no further description is needed.

From the foregoing description, operation of the apparatus should now be understood. The roll of bag material 10 is fed along a path, and the zipper material 20 is fed from the rolls 18 and 19 adjacent to the center of the bag material 10. The lifter 21 lifts the front pieces 12 and 14 so the zipper material 20 can be placed between the front pieces 12 and 14 and the back 11.

Next, the aligning rolls 22 accurately align the zipper material 20 just before the assembly enters the back sealer 24. The back sealer 24 is positioned with the upper unit 55 and lower unit 56 barely engaging the assembly, and the motion of the bag material 10 causes rotation of the belts 60 and 66 at the same linear speed as the bag material 10.

The heater bars 74, 75 and 76 are vertically adjusted so the sealing rails, such as the rails 95 and 99, engage the belt 66 to transmit a sufficient amount of heat to seal the back 11 to the back piece 90 of the zipper 20. It will be understood that the power to the heaters and the speed of the bag material must be considered in effecting the seal. Though no precise figures can be given, those skilled in the art can quickly determine proper operation by observing the material after it passes through the back sealer 24. If the seal is not a good, strong weld, the heat is insufficient; and, if the front piece 12 or 14 is sealed to the back piece 90 of the zipper 20, the heat is too great.

As the bag material 10 leaves the back sealer 24, the angled rolls 25 and 26 keep the web straight while the web of bag material 10 enters the rolls 28 and over the sealing roll 29.

It will be understood that the hot air distributors 30 and 31 are accurately aligned to direct the heated air on the band, where the front pieces 12 and 14 overlap the front pieces 100 of the zipper 20. Again, the material must be examined, and the heat and/or speed adjusted to effect a good weld without welding the front and back pieces of the zipper 20 together.

Following sealing of the front of the bags, the bag material 10 is slit between the two upper flanges 91 of the two zippers 20; then, bags are sealed and cut, as along the lines 34.

It will of course be understood by those skilled in the art that the particular embodiment of the invention here presented is by way of illustration only, and is meant to be in no way restrictive; therefore, numerous changes and modifications may be made and the full use of equivalents resorted to, without departing from the scope of the invention as defined in the appended claims.

I claim:

1. A method for making plastic bags having zipper closures, wherein said bags are made of a light gauge thermoplastic and said zipper closures are made of a heavy gauge thermoplastic, said method including the steps of feeding bag material along a path, said bag material including a back and opposed front pieces, feeding a first strip of zipper material along said path adjacent to one front piece and feeding a second strip of zipper material along said path adjacent to the other front piece, lifting said front pieces from said back and feeding said zipper material into position between said back and said front pieces, aligning said first strip and said second strip of zipper material with said bag material, moving said bag material with said zipper material along said path while engaging the front of said bag material with a first belt and engaging the back of said bag material with a second belt, holding sealing rails against said second belt while heating said sealing rails sufficiently to seal said back to said zipper material, further feeding said bag material along said path, directing air against the front piece of said bag material, and heating said air sufficiently to seal said front piece to said zipper material, slitting said bag material longitudinally, and sealing transverse lines across said bag material to side seal and separate bags from said bag material.

2. A method as claimed in claim 1, said zipper material comprising a zipper back piece and a zipper front piece, said zipper back piece having an upper flange and a lower flange, the step of holding sealing rails against said second belt further including the holding of a first sealing rail adjacent to said lower flange of said zipper back piece and simultaneously holding a second sealing rail adjacent to said upper flange of said zipper back piece, so that said lower flange and said upper flange are sealed to said back of said bag material.

3. A method as claimed in claim 2, and further including the step of holding said bag material laterally taut during the step of further feeding said bag material along said path, placing said back against a sealing roll for holding said bag material during the step of directing air against the front piece of said bag material.

4. A method for making a plastic bag having a zipper closure, wherein said bag is made of a light gauge thermoplastic and said zipper is made of a heavy gauge thermoplastic, said method including the steps of placing said zipper between the front piece of said bag and the back of said bag in position to form said zipper closure for said bag, holding the top of said bag with said zipper between a pair of belts, moving said belts while holding sealing rails against one of said belts, said sealing rails being located to seal said zipper to the back of said bag, and adjusting the heat so that said zipper is sealed to the back of said bag, holding said bag while directing heated air against said bag along a line for sealing said front piece of said bag to said zipper, and sealing the sides of said bag.

5. A method as claimed in claim 4, said zipper comprising a front zipper piece having a lower flange and a back zipper piece having an upper flange and a lower flange, the step of placing said zipper between the front piece of said bag and the back of said bag including placing said back zipper piece on said back piece of said bag, and placing said front piece of said bag over said front zipper piece.

6. Apparatus for making zipper bags wherein the zippers are made of heavy gauge plastic and the bags are of light gauge plastic, said bags being formed from bag material having a back piece and opposed front pieces, said apparatus including means for feeding said bag material along a path, means for lifting said opposed front pieces from said back piece, means for feeding zipper material between said opposed front pieces and said back piece, aligning means for aligning said zipper material with respect to said opposed front pieces, back sealing means for sealing said back piece to said zipper material, said back sealing means comprising a plurality of sealing rails, a belt movable over said sealing rails and engaging said back piece of said bag material and movable with said bag material, means for heating said sealing rails, a second belt engaging said opposed front pieces of said bag material and movable with said bag material for holding said bag material against said belt and for urging said belt against said sealing rails, and means for sealing said front piece to said zipper material.

7. Apparatus as claimed in claim 6, said back sealing means further including a plurality of heater bars, each heater bar of said plurality of heater bars carrying at least one of said sealing rails, and a heater in each heater bar for heating said heater bar.

8. Apparatus as claimed in claim 6, and further including a sealing roll across said path for receiving said bag material, a land on said roll, and means for directing heated air against said land for sealing said front pieces of said bag material to said zipper material.

9. Apparatus as claimed in claim 8, said means for directing heated air comprising a distributor concentric with said roll for directing heated air against said roll.

* * * * *